United States Patent Office 2,984,550
Patented May 16, 1961

2,984,550

COLOR STABILIZATION OF PETROLEUM OILS AND COMPOSITIONS THEREFOR

Walter M. Chamot, Brookfield, Ill., assignor to Nalco Chemical Company, a corporation of Delaware No Drawing. Filed Sept. 6, 1956, Ser. No. 608,203

7 Claims. (Cl. 44—62)

This invention relates to stabilization of petroleum distillate fractions against darkening during storage and to improvement in filtration characteristics of the stored oils.

The three general methods for producing distillates of the desired boiling range involve distillation of natural petroleum oils, thermal cracking of petroleum oils and fractions thereof and catalytic cracking of petroleum oils and fractions thereof. Cracking is the process of converting large hydrocarbon molecules into smaller ones by the application of heat and/or catalysts. Thermal cracking is usually conducted under high temperatures and pressures. Catalytic cracking is a more recent development and employs a finely divided solid catalyst.

In addition to gasoline and gas, relatively high boiling distillates are produced in the distillation of straight run petroleum, thermally cracked petroleum and catalytically cracked petroleum. These distillates are largely furnace or heating oils and diesel fuels. The highest boiling fraction which is not distilled over is usually termed "residual oils." These fractions have a boiling point in excess of about 380° F.

It has been found that these higher boiling fractions from straight run oils, thermally cracked oils, catalytically cracked oils and blends thereof tend to darken upon storage. While this darkening is not thought to materially affect the oils in their intended uses, the darkening has a definite effect on marketability in the case of furnace oils, for example. The consumer seems to prefer the lighter colored oil over the darker colored oil—probably largely because the darker oil looks "dirty." Furthermore, it has been discovered that the aforesaid higher boiling fractions tend to develop upon storage compositions which plug filters and hence decrease the filtration rate.

It is an object of this invention to provide means for color stabilization of higher boiling petroleum fractions.

A further object is to provide compositions for addition to furnace oils and diesel fuels for stabilization of the color thereof.

Another object is to provide compositions for addition to higher boiling petroleum fractions whereby the filtration rate of said oils is improved.

The compositions which are added to the higher boiling fractions of petroleum oils comprise as essential active ingredients (a) polymers produced from acetone or aryl hydroxides, formaldehyde, and polyamines by the Mannich synthesis and (b) the reaction product of formaldehyde and a primary or secondary monoamine. The polymers are more particularly described in my copending applications filed concurrently herewith for inventions entitled, "Mannich Synthesis with Diamines," Serial No. 608,185, filed September 6, 1956, and "Mannich Synthesis with Polyalkylene Polyamines," Serial No. 608,186, filed September 6, 1956, both now abandoned, the disclosures of which are incorporated herein by reference.

Briefly, the reactants for polymers produced by the Mannich synthesis are (1) acetone or aryl hydroxides wherein at least two positions in the aryl ring are available for reaction in the Mannich type synthesis, and preferably having at least one position in the aryl ring in addition to the hydroxyl group position occupied (2) an aldehyde, preferably formaldehyde, and (3) polyamines which include diamines and amines having three or more amino groups per molecule. Specific aryl hydroxides which may be used to produce the polymers include the monophenols—phenol, cresols, the xylenols, mesitol, thymol and higher alkyl substituted homologs such as ethyl phenol (phlorol), propyl phenol, diethyl phenol, dipropyl phenol, octyl phenol, dioctyl phenol, nonyl phenol, dinonyl phenol and other alkyl phenols having alkyl groups up to 18 carbons in length; the diphenols or dihydroxy benzenes-pyrocatechol (2-hydroxy phenol), resorcinol (3-hydroxy phenol), quinol or hydroquinone (4-hydroxy phenol), orcinol or dihydroxy toluene, and dihydroxy-xylene; triphenols or trihydroxy benzenes-pyrogallol and methyl pyrogallol; amino phenols such as monoamino phenol (p-aminophenol), diamino phenol and triamino phenol; salicylaldehyde; and hydroxy naphthalenes such as naphthol and alkyl substituted naphthols.

Mixtures of the foregoing compositions may also be used in preparing the compositions of this invention and from an economic standpoint the mixtures are often to be preferred. Illustrative commercially available mixtures include cresylic acids (mixtures of the various homologs of cresols, often containing substantial quantities of xylenols) and commercial nonyl phenols which contain up to about 25% dinonyl phenol.

The aldehyde preferably is formaldehyde in any of its commercially available forms such as formalin (40% aqueous formaldehyde solution), paraformaldehyde, alcoholic solutions (the formcels) and trioxane. Acetaldehyde may also be used.

The diamines are preferably alkylene diamines but may be aryl diamines, preferably having at least one primary amine group. Ethylene diamine, propylene diamine, butylene diamine, pentamethylene diamine, and hexamethylene diamine are primary diamines which may be used in preparing the compositions of this invention. Presently, ethylene diamine and hexamethylene diamine are the two most available in commercial quantities. Substituted alkylene diamines such as ethyl ethylene diamine, hydroxyethyl ethylene diamine, N, N' dihydroxy ethyl ethylene diamine and N-ethyl, N'-amino ethyl ethylene diamine may also be used. Other diamines such as diamino ethyl ether and diamino ethyl thioether may also be employed. Hydrozine may be used also.

The polyamines, having three or more amino groups, may be an unsubstituted or partially substituted polyalkylene polyamines, preferably having at least one primary amine group. Diethylene triamine, triethylene tetramine and tetraethylene pentamine are polyalkylene polyamines having two primary amino groups. Others include corresponding polypropylene polyamines. Other polyamine compositions which may be used are compositions which are higher homologs of the foregoing polyamines and which are usually available as mixtures obtained as residues in the production of the foregoing polyamines. The polyalkylene polyamines may be partially substituted as, for example, monoamido polyalkylene polyamines and N-alkyl or N-hydroxylalkyl substituted polyalkylene polyamines having at least two primary and/or secondary amine groups.

As disclosed in my aforesaid copending applications, the phenol or acetone-aldehyde-polyamine oil-soluble polymer may be prepared by several processes. In one instance, the polyamine is mixed with the phenol or acetone and the mixture is cooled to 0–10° C. The aldehyde is added drop-wise while the reaction mixture is maintained at 0–10° C. over a period of one-half to two hours. The reaction mixture is stirred for an additional hour. During this interval the reaction temperature is allowed to rise to room temperature, and the mixture is then usually heated at 50–60° C. for an additional hour. An aromatic solvent is added to the mixture, and the water in the reaction mixture is separated from the oil phase. The solution of the polymer in the aromatic solvent may be used as such, or the solvent may be removed by vacuum distillation.

In another method of preparation, the polyamine is mixed with the phenol or acetone and the mixture is cooled to room temperature. The aldehyde is added in small portions to the reaction mixture. The temperature is maintained at 25–40° C. during addition time of one-half to two hours. After all the aldehyde has been added, the water may be removed in the manner previously described, or the water may be decanted and traces of water removed under vacuum at temperatures of 70–110° C.

In another method of preparation, the polyamine is mixed with the acetone or phenol, and the aldehyde is added in small portions over a period of one-half to two hours. During this period the temperature is allowed to rise to 50–80° C. The reaction mixture is stirred for an additional one-half to two hours, and the water is then removed by decanting and traces of water are removed under vacuum at temperatures up to 150° C. When solid paraformaldehyde is used as the aldehyde, the water removal steps are unnecessary, and the reaction mixture may be cooled to room temperature and used as is. If the aldehyde is added to the reaction mixture rapidly over a short time interval, the recommended heating time after addition of the aldeheyde may be as high as six hours at temperatures between 60–80° C. When the aldehyde added is formaldehyde in alcoholic solution (a Formcel), the reaction mixture may be used as is or the solvent may be removed under vacuum.

The degree of polymerization in all cases is important to the extent that an oil-soluble product be produced. To this extent, as illustrated in the examples of the aforesaid copending application, the molar ratios are controlled so that a substantially linear polymer is produced, which polymer is essentially free from cross-linking. As set forth in the specific examples in my aforesaid copending applications, the polymers are produced by the condensation polymerization of two mols of aldehyde per mol of phenol with the ratio of phenol to polyamine being in the range of 1:1 to 2:1, respectively. The polymers may have a phenol or acetone-aldehyde-polyamine ratio of 1:2:1, respectively.

Although it is not absolutely essential for the purposes of this invention to combine the foregoing polymers with the reaction product of formaldehyde and a primary or secondary aliphatic monoamine, it is preferred to use the two compositions in the oil additive. One embodiment of this invention is the combination of (1) the polymers produced by the Mannich synthesis and (2) the reaction product of primary or secondary aliphatic monoamines and formaldehyde as new compositions of matter, with or without solvents. The amine-formaldehyde reaction products are prepared by mixing together at room temperature formaldehyde solution, aqueous or alcoholic, with aliphatic primary and secondary monoamines, the amine preferably containing at least 8 carbons in the aliphatic group or groups. These amines include dibutylamine, diamylamine, octylamine, nonylamine, dodecyl amine, octadecyl amine, etc.

In general, the formulations serving as additives for the higher boiling fractions of petroleum oils will comprise the aforementioned active ingredients along with a cosolvent such as lecithin or an alcohol, and hydrocarbon carriers, either aromatic, aliphatic or mixtures thereof. These compositions are typified by the following general composition:

|  | By weight |
|---|---|
| Mannich synthesis polymers | 5 to 50% or 1–10 parts. |
| Aliphatic monoamine-formaldehyde reaction product | 5 to 50% or 1–10 parts. |
| Lecithin | 0 to 20% or 0–4 parts. |
| Hydrocarbon solvent as required. | |

The following are examples of formulations, principally concentrations, of the ingredients of treating agents within the scope of this invention. The percentages given are by weight.

EXAMPLE I

| | Percent |
|---|---|
| Mannich synthesis polyamine polymer | 20 |
| Monoamine-formaldehyde reaction product | 25 |
| Aliphatic solvent (Bronoco 365) | 30 |
| Aromatic hydrocarbon solvent (Bronoco 100 WR) | 20 |
| Lecithin | 5 |

EXAMPLE II

| | |
|---|---|
| Mannich synthesis polyamine polymer | 30 |
| Monoamine-formaldehyde reaction product | 35 |
| Isopropanol | 15 |
| Aromatic hydrocarbon solvent (Bronoco 100 WR) | 20 |

EXAMPLE III

| | |
|---|---|
| Mannich synthesis polyamine polymer | 37.5 |
| Monoamine-formaldehyde reaction product | 47.5 |
| Isopropanol | 15.0 |

Lecithin, isopropanol, aromatic hydrocarbons and aliphatic hydrocarbons are solvents with different solvency characteristics. The selection of a solvent or combination of solvents is largely dependent on the nature and the amounts of the other components in the formulation and can be varied considerably with different concentrations of the individual ingredients.

*Evaluation of the invention*

The effectiveness in color stabilization of various distillates by the polymers of this invention was ascertained in high temperature tests and in long term storage tests. In the high temperature tests the oils containing the color stabilizers were held at 150° C. for 90 minutes, and the color of the oil was ascertained at the end of the testing period. The results of the tests with the various types of color stabilizing compositions at solution dosages of 250 p.p.m. are summarized in the following table. Oil X is a #2 cracked oil consisting of 100% thermally cracked distillate. Oil Y is a blended #2 distillate fuel comprising 70% straight run distillate and 30% thermally cracked distillate.

Table I
HIGH TEMPERATURE TESTS

| Active Ingredients | Oil X | | Oil Y | |
|---|---|---|---|---|
| | N.P.A. Color | Filter Pad | N.P.A. Color | Filter Pad |
| None | >8 | 16-18 | >8 | 20 |
| 10% Xylenol-Formaldehyde-Duomeen T Polymer, 20% Methyl Formcel | 4½+ | 14 | 8 | 15 |
| 20% Xylenol-Formaldehyde-Duomeen T Polymer | 3½ | 5 | 6 | 17 |
| 20% Xylenol-Formaldehyde-Duomeen S Polymer | 3½— | 10 | 6 | 17 |
| 10% Xylenol-Formaldehyde-Duomeen S Polymer, 25% Methyl Formcel | 4½ | 15 | 8 | 18 |
| 17% p-Cresol-Formaldehyde-Ethylene Diamine Polymer | 3 | 14 | 3½ | 16 |
| 10% p-Cresol-Formaldehyde-Ethylene Diamine Polymer, 25% Methyl Formcel | 3½— | 10 | 4½ | 17 |
| 20% Phenol-Formaldehyde-Diethylene Triamine Polymer | 3 | 16 | 4 | 18 |
| 12.5% Phenol-Formaldehyde-Diethylene Triamine Polymer, 37.5% Methyl Formcel | 3+ | 7 | 4¾ | 18 |
| 20% Xylenol-Formaldehyde-Ethylene Diamine Polymer | 3½ | 12 | 4½ | 16 |
| 8% Xylenol-Formaldehyde-Ethylene Diamine Polymer, 10% Lecithin | 4½ | 14 | 7 | 17 |
| 20% Xylenol-Formaldehyde-1,3 Propylene Diamine Polymer | 3½ | 12 | 4½ | 16 |
| 8% Xylenol-Formaldehyde-1,3 Propylene Diamine Polymer, 10% Lecithin | 5 | 15 | 6 | 17 |
| 20% Xylenol-Formaldehyde-Diethylene Triamine Polymer | 3 | 11 | 4 | 16 |
| 8% Xylenol-Formaldehyde-Diethylene Triamine Polymer, 10% Lecithin | 3¾ | 9 | 4½ | 17 |
| 20% Xylenol-Acetaldehyde-Ethylene Diamine Polymer | 3½ | 10 | 4½ | 17 |
| 8% Xylenol-Acetaldehyde-Ethylene Diamine, Polymer, 10% Lecithin | | | | |
| 20% Xylenol-Acetaldehyde-Diethylene Triamine Polymer | 3½ | 15 | 4½ | 17 |
| 20% Xylenol-Acetaldehyde-Duomeen T Polymer | 5 | 14 | 5 | 17 |
| 20% Reaction Product of Salicylaldehyde-Formaldehyde-Diethylene Triamine | 3½ | 13 | 4½ | 17 |
| 20% Nonyl Phenol-Formaldehyde-Ethylene Diamine Polymer | 3½ | 6 | 4½ | 15 |
| 20% Nonyl Phenol-Formaldehyde-Diethylene Triamine Polymer | 3½ | 7 | 4½ | 15 |
| 20% Nonyl Phenol-Formaldehyde-Duomeen T Polymer | 4½ | 13 | 4½ | 16 |
| 10% Nonyl Phenol-Formaldehyde-Duomeen T Polymer, 20% Formaldehyde | 5½ | 14 | 5 | 18 |
| 10% Nonyl Phenol-Formaldehyde-Diethylene Triamine Polymer, 20% Formcel | 3¼ | 8 | 4½ | 17 |
| 10% Nonyl Phenol-Formaldehyde-Diethylene Triamine Polymer 20% Formcel | 4½ | 14 | 8 | 18 |

Acetone-formaldehyde-polyamine polymers will give similar results. These polymers show some water solubility whereas the polymers in the above table are essentially water-insoluble.

The filter pad test is conducted by filtering the oil through #1 Whatman filter paper. The dark colored sludge remaining on the filter paper is compared with a standard set of filter pads which are progressively darker as the index number increases.

Duomeen T is the reaction product of acrylonitrile and primary amines derived from tallow fatty acids. Duomeen S is a similar product derived from soybean oil acids or other similar fatty acids.

Long term storage tests were conducted by holding various types of distillates containing the compositions of this invention for 13 or 26 weeks as indicated. The samples were held in vented containers in contact with deionized water and iron nails and were cycled between 80° F. and 110° F. The various distillates tested are listed below and are designated with a letter index corresponding to the index letter appearing in the table following:

Oil A
A blended #2 diesel fuel:
Percent
Straight Run _____ 70–75
Catalytic Cracked _____ 25–30

Oil B
A blended #2 diesel fuel:
Straight Run _____ 50–55
Cracked Catalytic Cycle _____ 45–50

Oil C
A blended #2 distillate fuel:
Straight Run _____ 70
Cracked Catalytic Cycle _____ 20
Thermally Cracked _____ 10

Oil D
A #2 distillate fuel blend:
Straight Run _____ 90
Catalytic Cracked _____ 10

Oil E
A distillate furnace oil:
Straight Run _____ 100

Oil F
A distillate fuel blend:
Straight Run _____ 50
Cat. Cracked _____ 30
Thermally cracked _____ 20

Oil G
A #2 Cycle Oil:
Cracked Catalytic Cycle _____ 100

The results of the long term storage tests appear in the following table:

Table II
LONG TERM STORAGE TESTS

| | Active Ingredients | Oil Tested | Solution Dosage, p.p.m. | Weeks Stored | N.P.A. Color | |
|---|---|---|---|---|---|---|
| | | | | | Untreated | Treated |
| I | 10% Phenol-Diethylene Triamine-Formaldehyde Polymer | A | 100 | 26 | 4½+ | 3¾ |
| | Composition I | B | 100 | 26 | 5 | 4½+ |
| | do | H | 300 | 26 | 5 | 4— |
| II | 5.5% Phenol-Diethylene Triamine-Formaldehyde Polymer | C | 300 | 13 | 4+ | 3¾ |
| | Composition II | F | 300 | 13 | 3 | 2¾ |
| III | 10% p-Cresol-Formaldehyde-Ethylene Diamine Polymer | B | 300 | 26 | 5 | 4¾ |
| | Composition III | C | 300 | 26 | 5 | 4¼ |
| | do | C | 100 | 13 | 4+ | 3½+ |
| | do | F | 300 | 26 | 5 | 4 |
| | do | F | 100 | 13 | 3 | 2¾ |
| IV | 10% p-Cresol-Formaldehyde-Ethylene Diamine Polymer | F | 300 | 26 | 5 | 4 |
| V | 10% Xylenol-Formaldehyde-Diethylene Triamine Polymer | C | 100 | 13 | 4+ | 3½+ |
| | Composition V | F | 300 | 13 | 3 | 2½+ |
| VI | 12% Octyl Phenol-Formaldehyde-Ethylene Diamine Polymer | C | 100 | 13 | 4+ | 4— |
| VII | 10% Cresol-Formaldehyde-Duomeen T Polymer | B | 300 | 26 | 5 | 4½+ |
| VIII | 20% Cresol-Formaldehyde-Duomeen T Polymer | B | 300 | 26 | 5 | 4½+ |
| IX | 10% Cresol-Formaldehyde-Duomeen T Polymer | H | 100 | 26 | 5 | 4½ |
| X | 20% Xylenol-Formaldehyde-Duomeen S Polymer | F | 300 | 26 | 5 | 4¼ |
| XI | Cresol-Formaldehyde-Phenylene Diamine Polymer | F | 30 | 26 | 5 | 4+ |

Further evaluations of the invention were made with the following composition, hereinafter designated as Composition A:

| | Percent |
|---|---|
| Dibutylamine-formaldehyde reaction product | 10 |
| Cresylic acid-formaldehyde-ethylene diamine polymer | 8 |
| Lecithin | 8 |
| Aromatic hydrocarbon solvent (Bronoco Hi Sol 100 WR) | 37 |
| Aliphatic hydrocarbon solvent (Bronoco solvent 365) | 37 |

The foregoing percentages are by weight. The cresylic acid used was largely xylenols containing some cresols.

*High temperature performance*

Twenty-six oils were tested in a high temperature stability test (90 minutes, 300° F.) to evaluate the effectiveness of color stabilization of the foregoing formulation in comparison with a commercial competitive product. On each oil the rating from 1–4 was given according to the N.P.A. color and filter pad tests, described supra— the rating 1 being the best and 4 being the worst. On this basis, the perfect score would be 26 and the worst score 104. The total score assigned to the oils treated by the above described formulation after the series of tests was 35, whereas the competitive product had a score of 50.

*Ambient temperature performance*

A commercial fuel oil having an original N.P.A. color of 1¾ was treated with the above Composition A at 240 p.p.m. The oil sample was agitated for two hours and stored at room temperature for 48 hours. Both untreated and treated samples were then washed with 10% deionized water by agitating for one hour. The samples were allowed to settle and the water was withdrawn with a pipette. The samples were then placed in storage and cycled between 80° F. and 110° F. in the presence of fresh, deionized water and iron nails. After 26 weeks, the N.P.A. color and filtration rates of the blank samples, samples treated with 240 p.p.m. of Composition A, and a competitive commercial product are represented in the following table:

*Table III*
COLOR AND FILTRATION RATE TESTS

| Additive | N.P.A. Color | Oil Passing Thru Screen, ml. | | | Filtration Rate (Sec./250 mls.) |
|---|---|---|---|---|---|
| | | 400 mesh | 250 mesh | 170 mesh | |
| None | 3¼ | 10 | 10 | 58 | 229 |
| Composition A, 240 p.p.m. | 2¾ | 222 | rest | | 53 |
| Competitive product, 150 p.p.m. | 3½+ | 5 | 18 | 36 | plugged |

The results in the columns, "Oil Passing Thru Screen," were determined in an apparatus comprising a 2" O.D. aluminum tube connected by a manifold to a 400 mesh screen, a 250 mesh screen, and a 170 mesh screen. The general testing procedure is as follows: The test sample is agitated vigorously for 2–5 minutes, preferably in a mechanical shaker. With 250 ml. graduated cylinders under each screen and about 300 ml. of oil in the cylinder, the manifold valve is positioned to feed oil to the 400 mesh screen. When flow through the 400 mesh screen becomes drop-wise (defined as "plugging"), flow is switched to the 250 mesh screen, and similarly to the 170 mesh screen when flow through the 250 mesh screen is drop-wise. When flow through the 170 mesh screen is drop-wise, the flow is shut off. The volumes of oil in each graduate are recorded. When fresh oils are tested, the entire sample usually passes through the 400 mesh screen without plugging.

The results in the column, "Filtration Rate," were ascertained by the following test: The samples are shaken for sixty seconds on an Eberbach variable speed shaker set at 80. The sample is then poured into the cylindrical container of filtration rate testing apparatus, which container has at one end three layers of Whatman #54 filter papers previously wetted with the oil under test. The effective filtration area is 4 cm. in diameter. Air pressure of ten p.s.i.g. is applied, and the time required to collect 250 ml. of oil is noted.

The foregoing compositions in five percent or more solution strength (by weight) may be employed at solution dosages between 25 and 1000 p.p.m., preferably 100–500 p.p.m., in the higher boiling fractions of straight run petroleum oils, thermally cracked petroleum oils, catalytically cracked petroleum oils, and blends thereof. At these dosages color stabilization and/or filtration rate improvement of oils held in storage is obtained with heating for furnace oils and diesel fuels, fractions having boiling points between about 380° F. and 640° F., and in some instances, as high as about 720° F. Color stabilization of residual oils, which are normally dark-colored, is not an important factor, but filtration rate improvement provided by the compositions of this invention is significant with residual oils.

The invention is hereby claimed as follows:

1. A refined petroleum oil distillate fraction having a boiling point in excess of 380° F. containing a small amount sufficient to stabilize the color thereof against darkening during storage of a polymeric condensation product obtained by the reaction of a phenol having two reactive ring positions, a lower aliphatic aldehyde having 1–2 carbons, and a polyamine having a reactive hydrogen atom on at least two amino nitrogens, said condensation product being formed by condensing the foregoing reactants at a molar ratio of 2 mols of said aldehyde per mol of said phenol and a molar ratio of phenol to polyamine in the range of 1:1 to 2:1, respectively, at an elevated reaction temperature sufficient to form a polymerized condensation product, said polymerized condensation product being essentially free of cross-linking and soluble in said distillate fraction.

2. The composition of claim 1 wherein the phenol-aldehyde-polyamine molar ratio is 1:2:1, respectively.

3. The composition of claim 1 wherein the polyamine is a diamine selected from the group consisting of alkylene diamines, aryl diamines and hydrazine.

4. The composition of claim 1 wherein the polyamine is a polyalkylene polyamine having 3–5 amino groups.

5. A refined petroleum oil distillate fraction having a boiling point in excess of 380° F. containing 25–1,000 p.p.m. of a solution of at least 5% strength of a polymeric condensation product obtained by the reaction of a phenol having two reactive ring positions, a lower aliphatic aldehyde having 1–2 carbons, and a polyamine having a reactive hydrogen atom on at least two amino nitrogens, said condensation product being formed by condensing the foregoing reactants at a molar ratio of 2 mols of said aldehyde per mol of said phenol and a molar ratio of phenol to polyamine in the range of 1:1 to 2:1, respectively, at an elevated reaction temperature sufficient to form a polymerized condensation product, said polymerized condensation product being essentially free of cross-linking and soluble in said distillate fraction.

6. A refined petroleum oil distillate fraction having a boiling point in excess of 380° F. containing 25–1,000 p.p.m. of a solution of at least 5% strength of a polymeric condensation product obtained by the reaction of a phenol having two reactive ring positions, a lower aliphatic aldehyde having 1–2 carbons, and a diamine having a reactive hydrogen atom on at least two amino nitrogens, said condensation product being formed by condensing the foregoing reactants at a molar ratio of 2 mols of said aldehyde per mol of said phenol and a molar ratio of phenol to diamine in the range of 1:1 to 2:1, respectively, at an elevated reaction temperature sufficient to form a polymerized condensation product, said polymerized condensation product being essentially free of cross-linking and soluble in said distillate fraction.

7. A refined petroleum oil distillate fraction having a boiling point in excess of 380° F. containing 25–1,000 p.p.m. of a solution of at least 5% strength of a polymeric condensation product obtained by the reaction of a phenol having two reactive ring positions, a lower aliphatic aldehyde having 1–2 carbons, and a polyalkylene polyamine having a reactive hydrogen atom on at least two amino nitrogens, said condensation product being formed by condensing the foregoing reactants at a molar ratio of 2 mols of said aldehyde per mol of said phenol and a molar ratio of phenol to polyalkylene polyamine in the range of 1:1 to 2:1, respectively, at an elevated reaction temperature sufficient to form a polymerized condensation product, said polymerized condensation product being essentially free of cross-linking and soluble in said distillate fraction.

References Cited in the file of this patent

UNITED STATES PATENTS

| | | |
|---|---|---|
| 2,353,192 | Sargent et al. | July 11, 1944 |
| 2,453,850 | Mikeska et al. | Nov. 16, 1948 |
| 2,696,427 | Biswell | Dec. 7, 1954 |
| 2,723,906 | Rogers et al. | Nov. 15, 1955 |

UNITED STATES PATENT OFFICE

CERTIFICATE OF CORRECTION

Patent No. 2,984,550                          May 16, 1961

Walter M. Chamot

It is hereby certified that error appears in the above numbered patent requiring correction and that the said Letters Patent should read as corrected below.

Column 5, Table I, column 2, line 4 thereof, for "3½-" read -- 3½+ --.

Signed and sealed this 28th day of November 1961

(SEAL)
Attest:

ERNEST W. SWIDER
Attesting Officer

DAVID L. LADD
Commissioner of Patents